Oct. 14, 1958  J. W. MANN ET AL  2,856,296
PROCESS OF HEATING DIELECTRICS BY EXTENDED TOROIDAL ELECTRODE
Filed July 9, 1956  3 Sheets-Sheet 1

INVENTORS
JULIUS W. MANN
GEORGE F. RUSSELL
BY Munn + Liddy
ATTORNEYS

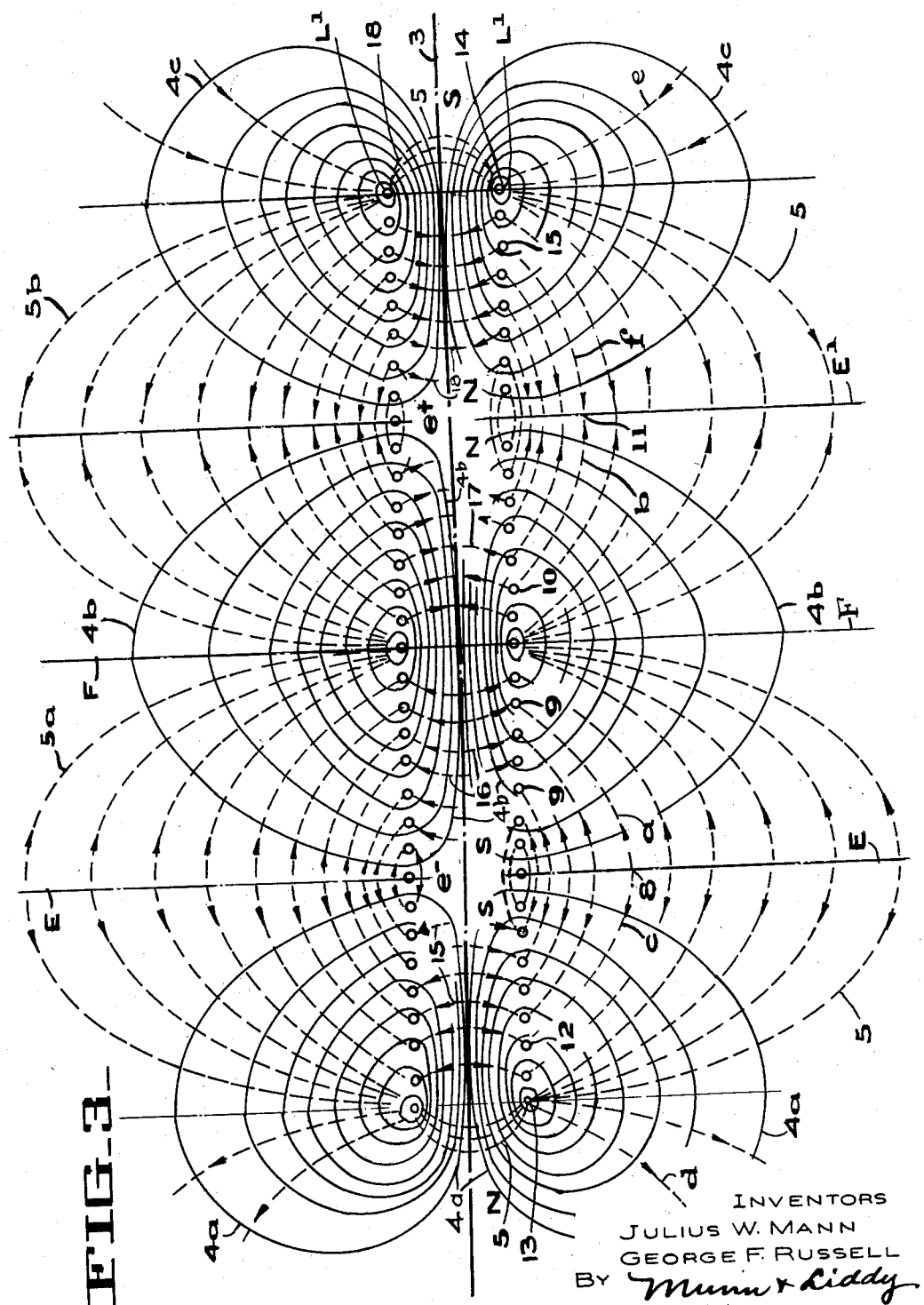

Oct. 14, 1958  J. W. MANN ET AL  2,856,296
PROCESS OF HEATING DIELECTRICS BY EXTENDED TOROIDAL ELECTRODE
Filed July 9, 1956  3 Sheets-Sheet 3

INVENTORS
JULIUS W. MANN
GEORGE F. RUSSELL
BY Munn & Riddy
ATTORNEYS

United States Patent Office 2,856,296
Patented Oct. 14, 1958

2,856,296

PROCESS OF HEATING DIELECTRICS BY EXTENDED TOROIDAL ELECTRODE

Julius W. Mann and George F. Russell, Tacoma, Wash.

Application July 9, 1956, Serial No. 596,738

10 Claims. (Cl. 99—221)

Our invention relates to improvements in a process of heating dielectrics by extended toroidal electrode and a process of dielectric high-frequency heating, and it consists in the combinations, constructions and arrangements, hereinafter described and claimed and in the steps hereinafter set forth.

The invention herein disclosed is a new concept of dielectric heating not envisioned in the present art where dielectric heating is commonly accepted as accomplished in a condenser field; and induction heating is commonly accepted as accomplished in an inductance field. Our invention is concerned with a particular electrode structure by which a high frequency field of force may be applied to dielectric work; and to the size, contour, shape and arrangement of such a structure for receipt of a work dielectric therewithin. Also the manner of disposition of the standing energy field on and in the electrode structure is a unique invention when applied to the electrode element of our particular design.

If a toroid is divided at one point and the two ends of the toroid thus provided, be extended so that the axis of its convolutions is a straight line rather than a circle, the toroid when connected to a high frequency generator would resonate on its first harmonic. The extremities of the toroid would therefore be at a high electric potential and the center would be at a low electric potential. We have invented means by which this patern of electric field distribution may be changed for 180° so that the high potential is approximately centered on the length and within the interior of the extended toroid while the extremities of the toroid fall to the lowest charge of the electric field distribution.

One way to accomplish this is to connect the extremities of such an extended toroid with a low inductance by galvanic connection. By this means we have been able to extend the toroid into a form the axis of whose convolution is straight or curved instead of circular. The toroid thus extended is adapted to receive a dielectric substance inside its convolutions. The extremities of the toroid are kept at a low electric field potential for the convenience of entrance and egress to and from the electric field of a dielectric that can also be moved inside the convolutions of the extended toroid from one end of the toroid to the other. By providing a low inductance conductor galvanically joining the extremities of the extended toroidal shape, we have invented a structure allowing the passing of dielectrics into a field at low electric potential at one end of the toroid, passing them progressively through a high electric field at the center of the toroid, and causing them to emerge from the opposite end of toroid again at a low intensity electric field of force of a half standing wave system of energy. High strain from the toroid to the dielectric is thus eliminated on the dielectric entering or departing the field and only after the dielectric enters the toroid or work channel does the electric field build up to the maximum at one or more interior points; the number of such points being dependent upon the number of half waves in the system.

The extended toroid when connected to a R. F. source of current provides a control of frequency and a stability of operation. The toroid may be excited by means of loose coupling or direct connection to a H. F. source of energy whose frequency matches the natural period of the toroid, thus establishing by reflection, a half or full standing wave of current and voltage, or multiples thereof, along the axis and exterior surface of the close helical winding.

The toroid electrode is designed to operate on its fundamental or first harmonic either to be the residence of a half or a full wave of reflected energy, although the invention contemplates the toroid operating on harmonics as well. It is possible to use the toroid when extended and its ends connected together and to a H. F. source, to pasteurize wine, milk or beer while the liquid passes through a carrier that extends along the extended toroidal axis. The carrier could be a rubber hose, plastic tube or glass tube that has a low dielectric loss character. In the pasteurization of wine, milk, beer, etc., experimentation makes us confident that the use of the unique character of the half wave, two spot heating effect developed within the convolutions of the extended toroid electrode will permit electronic flash pasteurizing and heat treatment of such products without the necessity of raising their temperature to the extent now required with conduction heating or to maintain such elevated temperatures for so long periods of time as now required to meet standards. The so-called two spot heating is disclosed in our Patent No. 2,599,850, issued June 10, 1952, on a process of controlling and placing of radio frequency heat in a dielectric.

Dielectric heat processing of materials for controlling enzymic reaction, bacteria control, catalytic reaction, etc., is by the herein described method made practical for the first time. This method makes use of the high-frequency field of force in such processes. Control and elimination of the growth of organisms in cereals and grains, flour, meals, etc., becomes practical when such material as may contain such foreign and undesirable organisms is passed through the high frequency field of force established in the manner herein described. Packaged foodstuffs or chemicals or solids of any dielectric type may be progressed through an electric field of force established in extended toroidal electrodes on an endless conveyor that extends substantially along the axis of the toroid. The convolutions of the electrode may be made large or small, as circumstance requires.

In the baking of breads, for example, the preheating of the dough is made possible by this process so that the internal heat is built up within the loaf before it is placed in the oven and this will speed up the baking process, improve the quality of the bread and allow a lower overall over-time compared to the present process of baking.

The killing of micro organisms in wine or milk for example is accomplished by the instant penetration of heat into the cells of the micro organisms by high-frequency electron heating. These cells are broken down by molecular dipole rotation. Pineapple juice, tomato juice, etc., can be pasteurized. Liquids that are ionizable are capable of pasteurization.

It is possible to heat treat solids such as peas, carrots, etc., vegetables and crushed materials with the high-frequency standing wave, generated on an extended toroidal electrode. The entire family of micro organisms can be considered as dielectric solids even through they cannot be seen with the eye.

Other objects and advantages will appear in the following specification, and the novel features of the device will be particularly pointed out in the appended claims.

Drawings

Our invention is illustrated in the accompanying drawings forming a part of this specification in which, Figure 1 is a view of a toroid coupled to a high-frequency generator so that a standing wave of radio-frequency will be induced thereon;

Figure 3 is a schematic view of the extended toroid electrode and illustrates the simultaneous field patterns of magnetic force interlaced with electric field lines of force that extend at right angles thereto when a radio-frequency standing wave is impressed on the electrode which comprises two half wave reflection;

Figure 5:
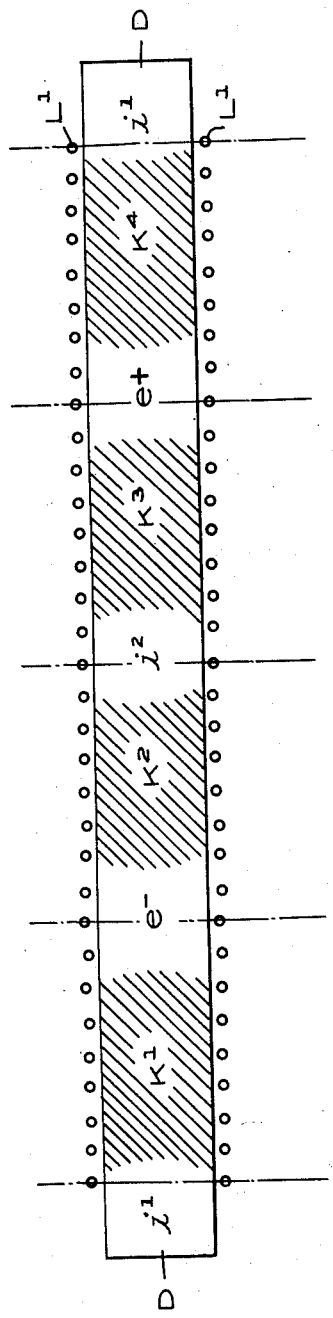
Figure 4:
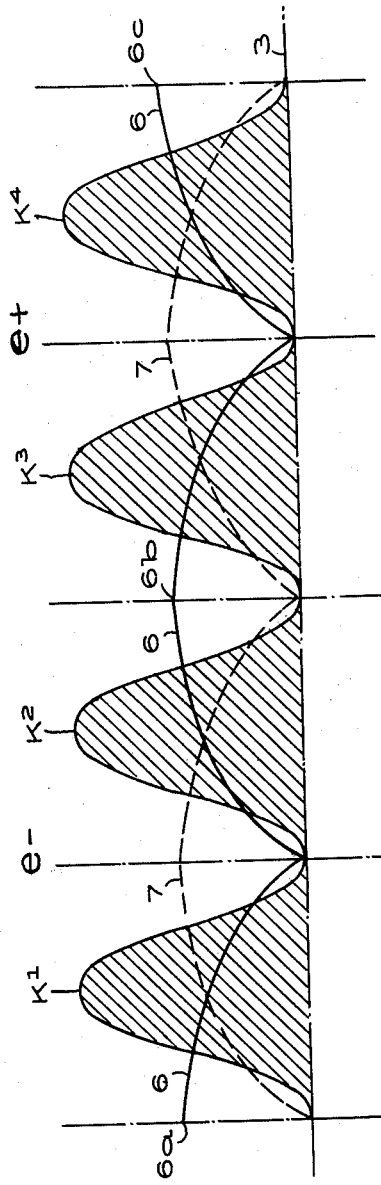

Figure 4 is a schematic showing of two half wave current and voltage curves which may stand along an extended toroid; and also show the peaks where the kinetic and potential energy, imparted to such an electrode, are converted, one to the other, and therefore where heat will be generated at these peaks at the maximum rate in a dielectric placed in the toroid; and Figure 5 is a standing wave energy pattern, plotted along the longitudinal axis of such an extended toroid electrode.

Our invention disclosed and claimed herein can be applied to practically all dielectric materials; solids, semi-solids, and liquids of various chemical compositions. The disclosures and discussions hereinafter undertaken of specific examples are not intended to limit the uses of the processes or apparatus described to any single class of dielectric. The invention is concerned with a method of applying to dielectrics the effect of a high-frequency alternating current field of force, the source of which is a generator of such currents. Such a generator which may be employed to accomplish the ends of the herein described invention is preferably of the type shown in our Patent No. 2,506,158, issued May 2, 1950, and entitled, Single Standing Wave Radio Circuit.

Figure 1:
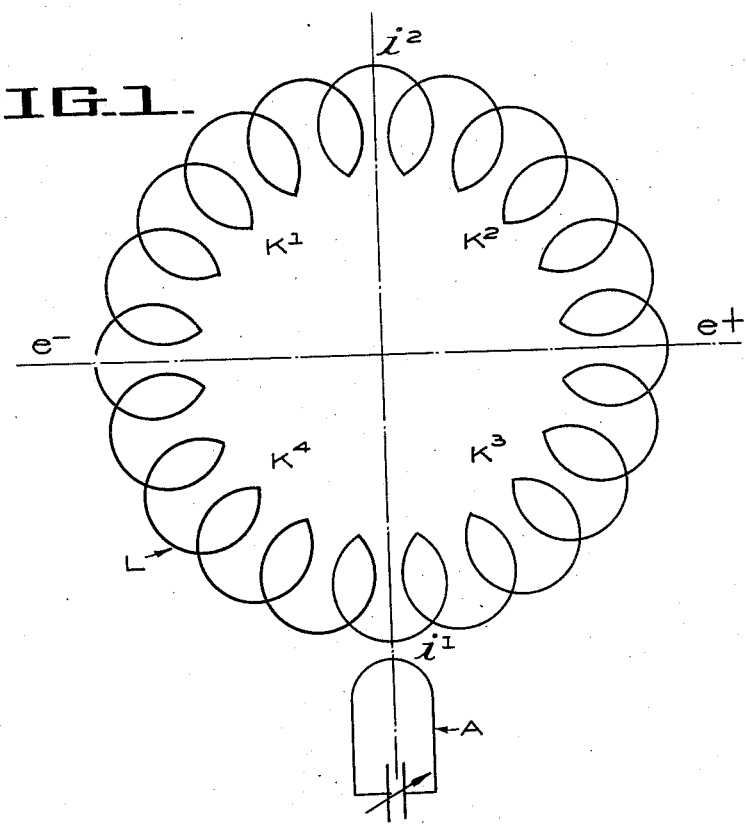

We take a toroidal contoured conductor of the type shown in Figure 1, and indicated at L. The toroidal shape here described is like a wire wound around the outer surface of a doughnut, the individual convolutions of the wire circling around the solid part, and circling back upon and meeting its starting convolution. The axis of the convolutions of the toroid L, shown in Figure 1, is circular. The cross section of the convolutions may be circular, triangular, rectangular or any other convenient shape or size, including non-symmetrical, without affecting the basic concept herein set forth.

A toroid of any shape described may be said to have inductance or may be said to be inductance-arranged in the toroid. We have invented a manner of including such a form in a radio-frequency circuit for dielectric heating. The toroid L in Figure 1, is inductively connected to a radio-frequency generator indicated schematically at A, and the ground potential "$i^1$" is shown at the point of connection. The toroid L could be directly connected to the R. F. generator A. The toroid L has a second ground potential "$i^2$" which is diametrically opposite to the first-mentioned ground potential "$i^1$". It will also be noticed that a voltage potential "$e-$," is disposed 90° in a clockwise direction from the ground potential "$i^1$," and a second voltage potential "$e+$," is disposed 90° in a counterclockwise direction from the same ground potential "$i^1$." This structure would house two half waves of standing energy, or one full wave.

The standing R. F. waves induced on the toroid L by the R. F. generator A, will have four heat-producing spots or areas in a full wave system indicated at $K^1$, $K^2$, $K^3$ and $K^4$. It will be noticed that the four K spots are arranged midway between the "$i$" and "$e$" areas in Figure 1, and the reason for this will be explained hereinafter.

If the toroid L, is divided at "$i^1$" in Figure 1, and is extended so that the axis of its convolutions becomes a straight or a curved line, such an extended toroid would resonate on the first harmonic with an electric field distribution that would place the extremities of the toroid at a high electric potential. The center of the toroid would be at a low electrical potential. Such a toroid would be dangerous to operate because the high potential at each end of the toroid would cause an arc to be established between the toroid and any dielectric brought near to the end. It would also be difficult to support the ends of the toroid where the high potential is also at the ends.

Figure 2:
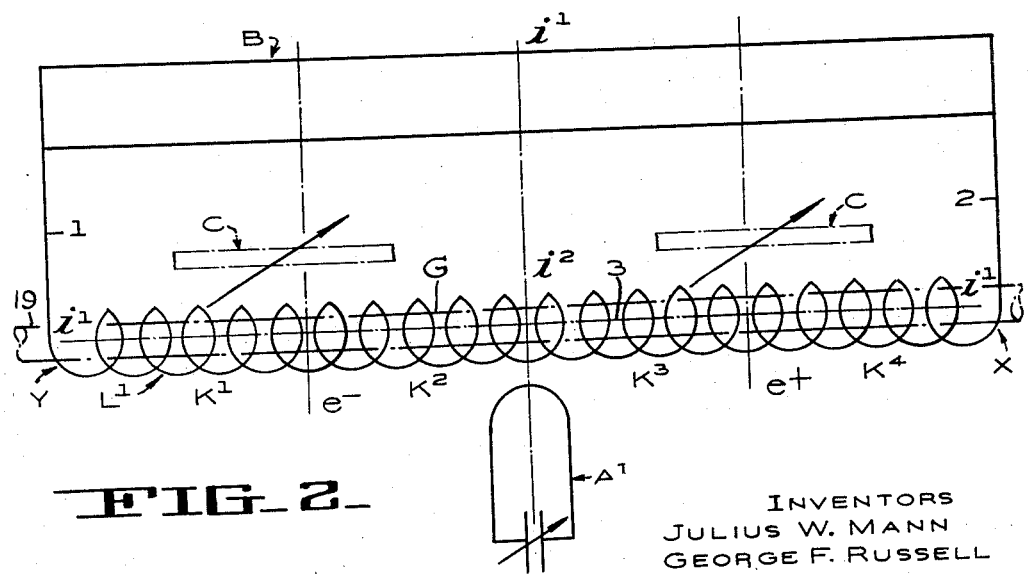
Figure 2 is a view of the toroid of Figure 1, shown extended and with its ends connected by a very low inductance extender.

We have solved this difficulty by opening up the toroid L of Figure 1, into the extended toroid $L^1$ of Figure 2, and connecting the extremities 1 and 2 of the toroid $L^1$ by a very low inductance extender, galvanic connection B. An R. F. generator $A^1$ is immediately coupled to the extended toroidal electrode $L^1$. There may be a direct connection between the R. F. generator and the extended toroidal electrode $L^1$ if desired.

The frequency response of the extended toroidal electrode is the same as for the toroid L in Figure 1, and the full wave pattern will be the same for both toroids L and $L^1$. This has been shown in Figure 2 by the same letters "$i^1$" and "$i^2$," and for "$e-$" and "$e+$." Also the four K spots $K^1$ to $K^4$ inclusive are indicated. By opening up the toroid L of Figure 1, into the toroid $L^1$ of Figure 2, and connecting the extremities 1 and 2 of the toroid $L^1$ with a low inductance galvanic connection B, and then inductively coupling the R. F. generator $A^1$ to the toroid, the extremities of the opened toroid will be kept at a low electric field potential as indicated by the ground potential "$i^1$" at the ends of the toroid.

We have been able to extend the toroid L into the form $L^1$, the axis of whose convolutions is straight or curved instead of circular. The ends of the extended toroid are kept at a low electric field potential for the convenience of the entrance and egress of dielectrics to and from the electric field of force. By providing a low conductance B, galvanically joining the extremities 1 and 2 of the toroid, we have invented a structure allowing the passing of dielectrics into an electric field at a low electric potential as at X in Figure 2, passing them progressively through a high electric field $e+$, a low electric potential "$i^2$," a second high electric field $e-$, and finally emerging the dielectric from the opposite end Y of the toroid, where a low intensity electric field force is again present.

The two extremities X and Y of the toroid $L^1$, will remain at approximately zero potential. This permits the extremities of the toroidal electrode to be at a minimum electrical charge and the dielectric materials can be passed through the toroid along the dot-dash work line 3 in Figure 2. The high electric strain from the electrode $L^1$, to the dielectric represented by the dotted line 3, is thus eliminated on the dielectric as it enters or leaves the extended ends of the toroid. Only after the entrance of the dielectric into the work channel 3 through the convolutions of the extended toroid, does the electric field build up to a maximum, and this at the "$e+$" and "$e-$" potential fields.

An experimental toroid was operated at 13.56 megacycles. The wire for the toroid was about fifty feet in length and the wire was coiled into approximately fifteen turns or loops of about twelve inches in diameter. The length of the toroid was approximately twelve inches and its extremities were connected galvanically and the galvanic connection was in turn connected to a source of H. F. energy. It may be seen therefore, that the extended toroid $L^1$ herein disclosed, is not limited to diameters of any certain size or cross section, but may be varied widely in dimension as the need arises for adaptation to a dielectric work load of a particular type or size, and may consist of one or more sections fed in a variety of ways.

Practical means for maintaining the exact frequency control with different dielectric loads, and maintaining a balance, has been found in the placing of variable capacity plattens C, in flat, curved or other convenient contour, near to the toroid $L^1$, see Figure 2, at approximate positions of the "$e+$" and "$e-$" charge on the toroid. The plattens C may be moved toward or away from the toroid $L^2$. In case a single ender half wave system is employed, a contact is provided between the capacitance platten C and the ground. In the double ender, it should be remembered that the capacitance plattens C are the neutral axis of a half wave of distributed capacity between "$e+$" and "$e-$" of alternate elements of a full wave system and hence can float if desired without ground return to a container or a box arranged to contain the electrode element.

The maintenance of a definite control of frequency and the suppression of radiation except to an allowable minimum is a prerequisite to commercial practicability in the present time use of the high frequency field of force for industrial applications under the rules of the Federal Communications Commission governing operation of such devices. Therefore the enclosure of the elements herein described in a metallic cabinet grounded and strapped to the electronic generator with only convenient openings, not shown, provided for entrance and egress of dielectric materials to be processed is a practical requirement for the use of the invention, but should not limit the scope of the invention to use only within such confines. If the structure we have invented is generally confined within a shielding means to prevent radiation, the entrance and exit terminations of the structure which are at zero "$e$" field charge, may be loaded with a dielectric through entrance and egress openings in the shielding means, not shown, facing the terminations of the extended toroids.

We have by inventing means of controlling the electric field placement on and in an extended toroidal electrode, invented new and novel uses of the two spot heating effect of the electric field in a half standing wave state; first described and claimed by us in our Patent No. 2,599,850, issued June 10, 1952, on the process of controlling and placing R. F. heat in a dielectric. The patent generally describes the phenomena in a condenser field. This phenomena we call the K spot heating effect or two spot heating. It is best now to refer to Figure 3 where the extended toroid electrode is shown schematically and we have also shown the simultaneous field patterns of magnetic lines of force interlaced with electric field lines of force that extend at right angles thereto when a full R. F. standing wave is impressed on the extended torodial electrode $L^1$ configuration.

The two parallel rows of small circles indicated at $L^1$ in Figure 3, represent a longitudinal cross section through an extended toroidal electrode housing a full wave. No more of the toroid $L^1$ is indicated because it is desired to show both the magnetic fields and the electrostatic fields at a given instant of time when a full R. F. standing wave is impressed on the toroid in the manner shown in Figure 2. The magnetic lines of force are indicated by full lines 4, that are formed into loops; while the electrostatic lines of force are indicated by dotted lines 5 that extend radially from the axis 3 of the toroid, to the loops of the toroid; and that also extend radially away from the outer periphery of the toroid loops in a manner now to be described.

The R. F. current flowing through the toroid $L^1$ will create a full standing wave and reference is made to Figure 4 of the drawings. The current graph "$i$" is indicated at 6, and the voltage graph "$e-$" and "$e+$" is indicated at 7. These graphs 6 and 7 are plotted along the cross section of the toroid $L^1$ in Figure 3, and extend from the toroid axis 3. The toroid $L^1$ is excited by the symbolic R. F. generator $A^1$ of Figure 2 and is cut to accommodate a full standing wave mode. It will be seen that the current loops shown by the graph line 6, reside at the middle and ends of the extended toroid, while the voltage loops shown by the graph line 7, reside about one fourth of a wave length in from each extremity of the toroid. Therefore there will be a minimum of voltage at the extremities of the toroid $L^1$.

This is a remarkable discovery because dielectrics can be passed into the toroid $L^1$ from either end and there will not be the least tendency for an arc to leap from the end of the toroid to the dielectric. Furthermore, the toroid can be supported at its ends without any danger of high voltage leaking off the ends and passing along the supports for these ends. The dielectric as it passes along the toroid when there is the residence of a full standing wave of R. F. energy from either end, will move gradually into a high voltage zone as one fourth the toroid length is reached. As the dielectric approaches the midpoint of the toroid, a voltage node is also reached and the current field will be at its height. From the middle of the toroid to the exit end, the dielectric will pass through another high voltage field which will be one fourth the length of the toroid from the exit end. By the time the dielectric reaches the exit end, the voltage node is reached and there will be no tendency for an arc to leap from the toroid end to the dielectric as the latter leaves the toroid.

Another vital feature of the invention lies in the fact that there are four K spots of high heating areas through which the dielectric passes as it traverses the length of a full wave toroid as illustrated at $L^1$. Both Figures 4 and 5 indicate these four K spots by shaded areas $K^1$, $K^2$, $K^3$ and $K^4$. In Figure 4, the shaded peaked areas $K^1$, $K^2$, $K^3$ and $K^4$, are the resultants of multiplying the instantaneous values of current and voltage "standing" along the extended toroid $L^1$, shown in Figure 3. The four peaks of the shaded areas also locate the position where kinetic and potential energy imparted to the system are converted one to the other, and to heat at a maximum rate. The peak $K^1$ is one eighth wave length from the left hand end of the toroid $L^1$ in Figure 3; while the peaks $K^2$, $K^3$ and $K^4$, are respectively three eighths, five eighths, and seven eighths wave lengths from the same toroid end. Therefore the dielectric will be subjected to peak heating conditions four times as it passes along inside the toroid $L^1$, that has a full wave standing thereon, and all of these heating areas are within the convolutions of the extended toroid.

Actual tests were made with a flat dielectric member D, see Figure 5, placed within the toroid $L^1$. The length of the member exceeded the length of the toroid and the width was slightly less than the inner diameter of the toroid. One entire surface of the member was made wet and then the member was placed in the toroid with the wet surface facing upwardly. The generator $A^1$ was turned on to cause a full standing R. F. wave to reside on the toroid. Immediately the wet shaded spots $K^1$, $K^2$, $K^3$ and $K^4$, on the member D in Figure 5, dried off, while the remaining portions of the surface continued to remain wet.

Another test was made. A shallow trough, not shown, of about the same size as the flat member D, was placed in the toroid $L^1$ and filled with water. When the generator $A^1$ was turned on and a full standing R. F. wave was impressed on the toroid, the water in the trough boiled at the four K spots, while the water in the remaining areas did not boil. As the power was increased, the boiling of the water at the four K spots became more vigorous and when the power was decreased, the opposite effect took place.

One theory for the extended toroid to operate in the manner above described, is illustrated in Figure 3 of the drawings. When a full standing R. F. wave is impressed on the toroid $L^1$, at a given instant of time, there will be a simultaneous field pattern of magnetic lines of force 4 interlaced with electric field lines of force 5, and in "standing" wave mode in and around the extended toroid $L^1$. Figure 4 shows by the graph line 6, that an R. F. current will be flowing through the toroid at the left hand end of the extended toroid $L^1$, shown in Figure 3. Therefore, magnetic lines of force indicated by the loops 4 will be formed. In fact three groups 4a, 4b and 4c of loops of magnetic lines of force will be formed and each group will have its center at a point where the flow of R. F. current is the greatest, i. e., at the three current anti-nodes or loops 6a, 6b and 6c in Figure 4.

Each loop 4 of a magnetic line of force represents a cross section through a donut-shaped shell whose axis coincides with the toroid axis 3, see Figure 3. The portions of the loops 4a, 4b and 4c, that lie within the area enclosed by the extended toroidal electrode $L^1$, will be positioned closer together and will parallel the toroid axis 3. The portions of the loops that lie outside the area of the toroid $L^1$, will not be crowded together to such an extent. The three sets of loops 4a, 4b and 4c, divide the toroid $L^1$ into three magnets arranged end to end, with the left hand magnet having a N pole at the left end, and a S pole at the right hand end. The S pole will be positioned adjacent to the voltage loop "e—" on the voltage graph line 7, see Figures 3 and 4. The middle magnet created by the magnetic loops 4b, will have a S pole disposed adjacent to the high voltage area "e—," and a N pole disposed adjacent to the high voltage area "e+." The right hand or third magnet will be similar to the left hand one and will have a N pole disposed adjacent to the high voltage area "e+," and a S pole disposed at the right hand end of the toroid $L^1$.

Figure 3 also shows electrostatic lines of force 5 in two groups of loops 5a and 5b. Notice the group 5a that has arrows indicating that the flow of electrons is away from a common plane E that extends at right angles or is normal to the toroid axis 3. The electrons sit and flow during the alternating high-frequency and mechanically resemble the swing of a pendulum. As an example, note the electrostatic line $a$ in Figure 3, starting from the plane E, below the axis 3. One group of electrons will flow from a "sitting" position at 8 on the plane E, and will move to the right along the line $a$ so as to cut the magnetic lines 4b at right angles because the magnetic lines always cross the electrostatic lines at right angles.

When the electrons flowing along line $a$, reach the point 9 on the toroid $L^1$, they will flow along the loops of the toroid until they reach the point 10, which is the same distance from the toroid center as the point 9, but is disposed to the right of center. The electrons will be flowing at their greatest speed as they pass the midpoint between the points 9 and 10 on the toroid $L^1$. At the point 10, the electrons will leave the toroid and will travel through space in a line $b$ that is at right angles to the portions of the magnetic loop lines 4b. The electrons will decelerate in their movement until they will "sit" when they reach the point 11 on a plane $E^1$ that parallels the plane E, and extends through the toroid $L^1$ at the "e+" area. This completes one half cycle or wave for the electrons from the point 8 on the plane E to the point 11 on the plane $E^1$. On the return half cycle, the electrons will merely retrace the path formerly taken and described.

At the same time, electrons will start from a "sitting" position at the point 8 on the plane E, and will flow to the left in Figure 3 along the line $c$ to the point 12 on the toroid $L^1$. Here the electrons will move along the convolutions of the toroid to the left hand end, where they will leave the toroid at 13 and travel into space along a line $d$, in Figure 3. Again the electrons will be flowing their fastest at the point 13 on the toroid. It may be possible that the electrons on reaching the end of the toroid at 13 will merely bunch together until the return swing starts, rather than leave the toroid and move along the path $d$. On the return swing, the electrons will retrace their path along the toroid from point 13 to 12, and then through space along the line $c$ to the point 8 on the plane E. The paths of the electrons along lines $c$ and $d$ is at right angles to the portions of the magnetic lines 4a, through which they pass.

A similar movement of electrons takes place from space along an electrostatic line $e$ to a point 14 at the right hand end of the toroid $L^1$. From here the electrons will flow along the toroid to the point 15, where they will move through space on the line $f$ to the point 11 on the plane $E^1$. This is one half of the cycle and the electrons will retrace their path on the remaining half of the cycle.

We have described how the electrons move on the outer surface of the toroid $L^1$. We will now describe the electron movement within the area confined by the toroid convolutions. There will be electrons moving radially outwardly from the toroid axis 3, for that portion of the toroid extending from the left hand end, up to "e—" or plane E of the toroid in Figure 3. The outward radial movement of the electrons from the toroid axis 3 to the convolutions forming the toroid $L^1$, are shown by the dotted arcuate lines 15. This will continue for one half of the cycle and then the movement will be reversed during the second half. The passage of the electrons will be at right angles to the portions of the magnetic lines of force 4a that are confined within the toroid $L^1$ and flow parallel with the toroid axis 3.

A similar radial flow of electrons from the toroid axis 3 to the convolutions of the toroid $L^1$, will take place in that portion of the toroid lying between the plane E, and a central plane F, that lies midway between the planes E and $E^1$, and parallels them. The flow of electrons is indicated by the arcuate dotted lines 16 in Figure 3. Notice again that these lines 16 cross at right angles, the portions of the magnetic lines of force 4b that are confined within the toroid $L^1$ and flow parallel with the toroid axis 3 between the planes E and F. The outward electron flow will be during one half of the R. F. cycle, and the return flow will be during the remaining half cycle.

From the plane F to the plane $E^1$, the electrons will move radially inwardly from the convolutions forming the toroid $L^1$ to the axis 3, as shown by the curved dotted lines 17, in Figure 3. This movement will take place during the first half cycle. The electron flow will be at right angles to the portions of the magnetic loops 4b that are confined within the toroid $L^1$ and disposed between the planes F and $E^1$. During the remaining half cycle of electron flow, the electrons will reverse their movement and will flow from the axis 3 where they have come to rest or "sit," and will return to the toroid $L^1$, where they will again sit, ready for the next R. F. cycle.

Between the plane $E^1$ and the right hand end of the toroid $L^1$, the electron flow within the toroid will be the same as that just mentioned as occurring in the area confined within the planes F and $E^1$ and the interior of the toroid. The dotted arcuate lines 18 indicate the electron flow from the loops of the toroid to the toroid axis 3 during one half of the R. F. cycle. The electron flow will be in the opposite direction during the remaining half cycle.

It is best now to refer to Figures 4 and 5 that indicate the result of the full standing R. F. wave on the toroid $L^1$ when the generator $A^1$ is turned on. The standing energy pattern of Figure 4 illustrates the current curve 6 and the voltage curve 7 which is shown 90° out of phase with the current curve. The four peaks of the shaded areas $K^1$, $K^2$, $K^3$ and $K^4$, represent the resultants of multiplying the instantaneous values of current and voltage "standing" along the extended toroid $L^1$ of Figure 3. The peaks of the shaded areas also locate the positions where kinetic and potential energy imparted to the system are converted, one to the other at a maximum rate. The shaded areas, therefore, represent centers of action where electromagnetic energy is converted to heat energy at the greatest rate. It will be noted from Figure 4, that the current loops of the curves 6, reside at the middle 6b and ends 6a and 6c of the curves, which also correspond to the middle and ends of the extended toroid $L^1$.

We have already described that Figure 5 represents one example of what takes place when a piece of material D is made wet on one surface and then inserted into the toroid $L^1$, after which the R. F. current is turned on. The heat generated by the toroid at the four K spots will instantly dry the wet surface of the material at the four shaded portions on D and indicated at $K^1$, $K^2$, $K^3$ and $K^4$.

Another example is shown in Figure 2, where a tube G has been inserted in the extended toroid $L^1$ and any type of dielectric material may be moved through this tube and have heat applied thereto at the four K spots in this figure. It is possible to pasteurize wine, milk or beer by flowing them through the tube at a desired rate of flow and applying the necessary amount of heat by turning on the R. F. generator $A^1$ that creates a standing R. F. wave on the toroid. Certain types of liquid are capable of ionization because they carry dielectrics that will be heated by the R. F. lines of force. Distilled water has almost zero ionization and therefore is only slightly susceptible to heating by an R. F. field of force. Liquids that are ionizable are capable of such heating and therefore of pasteurization. The liquids just mentioned, namely: wine, milk, beer, etc., are usually ionized sufficiently to be R. F. pasteurized. Where purification by pasteurization is required, the term solid dielectrics will include anything in the liquid.

In the present case, the extended toroid $L^1$ operates for a portion of its length as a condenser field and the remaining portion of its length as an inductive field. There are two K spot heating effects in each half standing wave component, and therefore there are four K spots of heating as indicated in the drawings where a full wave of standing wave energy is made.

Liquids flowing through the tube G that lies inside the convolutions of the toroid $L^1$, as represented by the dot dash lines in Figure 2, will heat at their greatest rate when in the vicinity of the four K spots. A solid placed in the convolutions of the extended toroid $L^1$ will first heat at the four K spots. Wood when placed in the toroid will first char at these four spots. Plastics placed in the toroid $L^1$ will explode first at the four K spots if the power is too high since these spots are the power peak points of the field. As already stated, these four heating spots "stand" in relation to space, the extended or opened toroidal electrode and the work itself in a full wave system where two such spots for each half wave of standing energy will exist.

While we have mentioned two spot dielectric heating effect in a condenser field in our Patent No. 2,599,850, we have so applied it in the present invention as to be of a useful purpose in the two or four spot heating of dielectric materials within the convolutions of an extended toroid electrode containing a half or full wave system. We claim that "two spot" or "four spot" dielectric heating in the convolutions of an extended toroid, is new and unique and has never been accomplished prior to our invention. The effects of this invention are of great importance to the industrial application of the dielectric high frequency heating.

Changes in length, diameter, and other dimensions of the toroid, may be made at will without escape from the principles of our new process. It is possible to have two pound packages of cereal, for example, standing up and arranged edge to edge, these packages progressing through an extended toroidal electrode $L^1$ designed in a rectangular form in cross section to just encompass the size of the boxed or sacked materials on an endless belt, not shown, of a suitable dielectric material. Also large or small sacks of flour could be passed through an extended toroidal electrode $L^1$ having an elliptical shape in cross section, the convolutions being made large enough to encircle the items. Such a toroid would have a high frequency current field of force operating on and within it to heat treat the items.

In the baking field, we feel the herein described invention will be most useful and practical to prebake prepackaged bakery products for final baking in the home. The defrosting of frozen foods, the heating of prepared frozen foods and other such operations become practical with this new process and structure.

We claim:

1. The process of dielectric high frequency heating within the convolutions of a metallic toroid excited by a source of high frequency alternating current and creating a standing wave of radio energy on the toroid.

2. The process of dielectric high frequency heating within the convolutions of an extended metallic toroid whose ends are galvanically connected; said extended toroid being excited by a source of high frequency alternating current which creates a standing wave of radio energy on the toroid; the axis of the convolutions of the said extended metallic toroid forming substantially a straight line.

3. The process of dielectric high frequency heating within the convolutions of an extended metallic toroid whose ends are galvanically connected; the axis of which convolutions form substantially a straight line; exciting the extended metallic toroid by a source of high frequency current so as to create thereon a full standing wave of radio frequency energy so as to place at the extremities of the said extended metallic toroid a current antinodal position of the standing wave field of force, and place between the toroid extremities the fields of high potential.

4. The herein described process of heat treating a dielectric which comprises enclosing the dielectric in an extended metallic toroid whose extremities are galvanically interconnected; and in creating a standing wave of radio frequency on the toroid so that high heat areas will be formed within the toroid; the dielectric being subjected to the heat of these areas.

5. The herein described continuous process of heat treating a moving dielectric, which comprises: moving the dielectric along the interior of an extended metallic toroid whose extremities are galvanically interconnected; creating a standing wave of radio frequency energy on the metallic toroid so that high heat areas will be formed within the toroid and between its extremities for heating the dielectric as it passes through the toroid.

6. The herein described process of pasteurizing edible material without bringing the material to the boiling point, which comprises moving the material along the interior of an extended metallic toroid whose extremities are galvanically interconnected; creating a standing wave of radio frequency energy on the toroid so that at least one high heat area will be formed within the toroid and between its extremities; the edible material in passing through the high heat area being raised to a temperature sufficient for pasteurization without bringing the material to its boiling point.

7. The process of dielectric high frequency heating within the convolutions of an extended metallic toroid whose ends are galvanically connected; the axis of which convolutions form substantially a straight line; exciting the toroid by a source of high frequency current so as to create thereon a standing wave of radio frequency energy so as to place at the extremities of the said toroid a current antinodal position of a standing wave field of force, and place between the toroid extremities fields of high potential with high heat areas being created in dielectrics placed within the toroid; the high heat areas lying between the current and voltage nodes.

8. The process of heating dielectric material by the effect of a high frequency alternating current field of force within an extended toroidal electrode, the axis of the convolutions of which forms substantially a straight line; and which extremities are galvanically connected and fed by a source of high frequency current and upon which extended toroidal electrode there stands two half waves of radio frequency energy so positioned that the center and end convolutions thereof hold minimum while the intermediate convolutions therebetween hold simultaneously maximum E field charges in a single full standing wave field of force.

9. The herein described process of heat-treating a dielectric disposed within the convolutions of an extended toroidal electrode by the action of a high frequency alternating current field of force impressed on the extended toroidal electrode so that the said heat will occur at two fixed areas in each half standing wave of radio frequency energy resident on the extended toroidal electrode, the axis of the convolutions of which is substantially a straight line.

10. The herein described process of heat-treating a dielectric disposed within the convolutions of an extended toroidal electrode whose axis is substantially a straight line, by the action of a high frequency alternating current field of force impressed on the extended toroidal electrode so that the heat will occur at four fixed areas in the full standing wave of radio frequency energy resident on the extended toroidal electrode.

References Cited in the file of this patent

UNITED STATES PATENTS

| | | |
|---|---|---|
| 2,193,622 | Coulter | Mar. 12, 1940 |
| 2,443,594 | Boettler et al. | June 22, 1948 |
| 2,476,251 | Swenson | July 12, 1949 |
| 2,483,623 | Clayton | Oct. 4, 1949 |